United States Patent
Li et al.

(10) Patent No.: US 8,401,563 B2
(45) Date of Patent: *Mar. 19, 2013

(54) DOWNLINK RESOURCE ALLOCATION AND MAPPING

(75) Inventors: Qinghua Li, San Ramon, CA (US); Xintain E. Lin, Palo Alto, CA (US); V. Srinivasa Somayazulu, Portland, OR (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,290

(22) Filed: Sep. 16, 2011

(65) Prior Publication Data

US 2012/0057542 A1 Mar. 8, 2012

Related U.S. Application Data

(63) Continuation of application No. 11/688,188, filed on Mar. 19, 2007, now Pat. No. 8,041,362.

(60) Provisional application No. 60/784,418, filed on Mar. 20, 2006.

(51) Int. Cl.
*H04Q 7/20* (2006.01)

(52) U.S. Cl. ............... 455/452.1; 370/329; 370/330; 370/343

(58) Field of Classification Search ............ 455/450, 455/452.1
See application file for complete search history.

(56) References Cited

U.S. PATENT DOCUMENTS

| | | | |
|---|---|---|---|
| 6,223,041 B1 | 4/2001 | Egner et al. | |
| 6,912,229 B1 | 6/2005 | Lauro et al. | |
| 6,993,006 B2 | 1/2006 | Pankaj | |
| 2001/0029519 A1 | 10/2001 | Hallinan et al. | |
| 2002/0062472 A1 | 5/2002 | Medlock et al. | |
| 2004/0107281 A1 | 6/2004 | Bose et al. | |
| 2005/0288030 A1* | 12/2005 | Choi et al. | 455/450 |
| 2006/0156087 A1 | 7/2006 | Lin et al. | |
| 2006/0205414 A1* | 9/2006 | Teague | 455/452.1 |
| 2007/0053320 A1* | 3/2007 | Rinne et al. | 370/329 |
| 2007/0086406 A1 | 4/2007 | Papasakellariou | |
| 2007/0217361 A1 | 9/2007 | Vannithamby et al. | |
| 2008/0267126 A1 | 10/2008 | Vujcic et al. | |

FOREIGN PATENT DOCUMENTS

| | | |
|---|---|---|
| KR | 1999-0060514 A | 7/1999 |
| KR | 2004-017864 A | 3/2004 |

OTHER PUBLICATIONS

Li et al., "Codebit Parsers for Adaptive Bit Loading over MIMO Channels," IEEE, 2006, 0-7803-9412-7/06, pp. 179-182.
R1-060095, "E-UTRA DL—Localized and distributed transmission," Ericsson, Jan. 23-25, 2006, 3 pgs.
R1-060245, "Sub-carrier Mapping for Distributed Allocation of EUTRA DL," Ericsson, Jan. 23-25, 2006, 5 pgs.
R1-060400, "Resource Allocation mapping rules and TP," Motorola, Feb. 13-17, 2006, 4 pgs.
R1-060873, "Downlink OFDMA resource allocation and mapping rules for distributed mode users in E-UTRA," Intel Corporation, Mar. 27-31, 2006, 5 pgs.
R1-061534, "E-UTRA Uplink and Downlink Control Signaling—Text Proposal," Intel, May 8-12, 2006, 3 pgs.
Office Action issued Sep. 26, 2011 from Chinese Application No. 200780009834.7.

(Continued)

*Primary Examiner* — Wesley Kim
*Assistant Examiner* — Joseph Dean, Jr.
(74) *Attorney, Agent, or Firm* — Schwabe, Williamson & Wyatt, P.C.

(57) ABSTRACT

Embodiments of the present invention provide for downlink resource allocation among a plurality of users. Other embodiments may be described and claimed.

18 Claims, 7 Drawing Sheets

OTHER PUBLICATIONS

International Search Report mailed Jul. 31, 2007 from International Application No. PCT/US2007/064442.
International Preliminary Report on Patentability mailed Oct. 2, 2008 from International Application No. PCT/US2007/064442.
Notice of Allowance mailed Jun. 21, 2011 from U.S. Appl. No. 11/688,188.
Notice of Allowance mailed Apr. 6, 2012 from Chinese Application No. 200780009834.7.
Supplemental EP Search Report and Written Opinion mailed Jan. 4, 2013 from EP Application No. 07758943.0.

* cited by examiner

US 8,401,563 B2

DOWNLINK RESOURCE ALLOCATION AND MAPPING

RELATED APPLICATIONS

This present application is a continuation of U.S. application Ser. No. 11/688,188, filed Mar. 19, 2007 and entitled "Downlink Resource Allocation and Mapping," which claims priority to U.S. Provisional Application No. 60/784,418, filed on Mar. 20, 2006. The specification of said applications are hereby incorporated in their entirety.

FIELD

Embodiments of the present invention relate to the field of wireless networks, and more particularly, to allocating and mapping resources in downlink transmissions of said wireless networks.

BACKGROUND

Multi-carrier communications systems use symbol-modulated sub-carriers to communicate. Changing channel conditions, including frequency selective fading, may provide challenges to providing uplink and downlink transmissions to users in the system with desired communication efficiencies.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
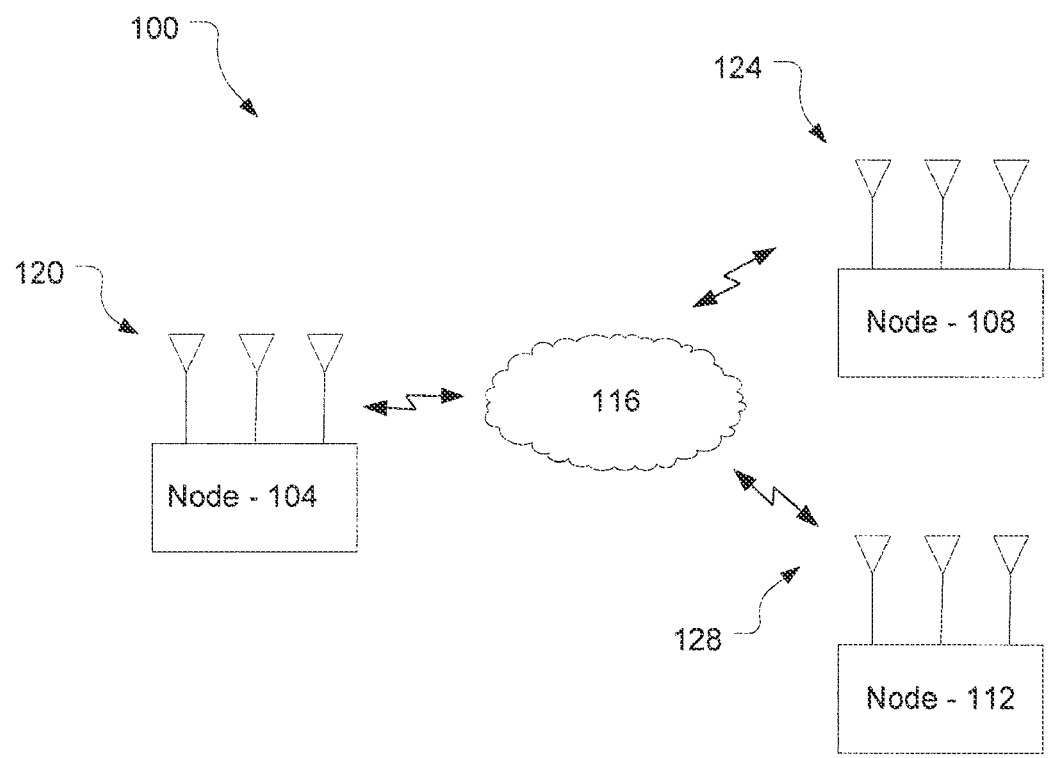
FIG. 1 illustrates a wireless communication system in accordance with various embodiments of the present invention.

FIG. 1 illustrates a wireless communication system 100 in accordance with an embodiment of this invention. In this embodiment, the communication system 100 is shown with nodes 104, 108, and 112 communicatively coupled to one another via a shared wireless medium 116. The nodes 104, 108, and 112 may access the shared wireless medium 116, hereinafter "medium 116," through antenna structures 120, 124, and 128, respectively.

Each of the antenna structures 120, 124, and 128 may have one or more antennas, e.g., three antennas as shown, for wireless communication via the common wireless medium 116. In various embodiments, any number of antennas may be employed. The antennas employed in the antenna structures 120, 124, and 128 may be directional or omnidirectional antennas, including, e.g., dipole antennas, monopole antennas, patch antennas, loop antennas, microstrip antennas or any other type of antenna suitable for transmission of radio frequency (RF) signals.

A link utilizing one transmit antenna (at a transmitting node) and one receive antenna (at a receiving node) may be referred to as a single-input, single-output link. A link utilizing more than one transmit and receive antennas may be referred to as a multiple-input, multiple-output (MIMO) link. A multi-antenna node may transmit information via the medium 116 over one or more spatial channels. A multi-antenna node may form up to as many spatial channels as it has antennas. For example, node 104 may form one, two, or three spatial channels for transmitting information over the medium 116.

The nodes 104, 108, and 112 may be any physical or logical entity for communicating information in the communication system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communication system 100 may be a radio access network compatible with the Universal Mobile Telephone System (UMTS) along with any revisions, amendments, or updates thereto (including, but not limited to, those resulting from the Seventh Release of the Technical Report produced by Third Generation Partnership Project ("3GPP"), 3GPP TR 25.814 V7.1.0 (2006-09)).

In various embodiments, the nodes 108 and 112 may be user equipment (UE) implemented in, e.g., a mobile computer, a personal digital assistant, a mobile phone, etc., and node 104, which may also be referred to as a node-B, may be implemented in a base transceiver station (BTS).

The node 104 may be arranged to communicate information over the medium 116 to and/or from the nodes 108 and 112. This information may include media information and/or control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, instruct a node to process the media information in a certain manner, or to communicate state information of a network to a node.

Transmissions in the direction of the nodes 108 and 112 to the node 104 may be referred to as an uplink transmission, while transmissions in the opposite direction may be referred to as a downlink transmission. These air interfaces may be compatible with UMTS Terrestrial Radio Access (UTRA) and/or Evolved-UTRA (E-UTRA) technologies. In some embodiments, downlink modulation schemes may be of a first type, e.g., orthogonal frequency division multiple access (OFDMA), while uplink modulation schemes may be of a second type, e.g., single carrier frequency division multiple access (FDMA).

In some embodiments downlink information may be transmitted over the medium 116 as multiple OFDM symbols spread over multiple sub-carriers, with adjacent sub-carriers being orthogonal to one another. The transmitted information may be organized into physical resource elements ("PREs") of a given channel. A PRE may be composed one or more sub-carriers, which may be arranged as a resource block including L consecutive sub-carriers and M time/frequency symbols. L and M may be any positive integers. The information to be transmitted may be initially arranged as one or more virtual resource elements (VREs), with the size of the VREs corresponding to the size of the PREs. The VREs may then be assigned to PREs for transmission according to allocation schemes described with reference to various embodiments of the present invention.

In some embodiments a localized transmission mode (LTM) may provide that information transmitted from a node-B, e.g., node 104, to a particular UE, e.g., node 108, may be confined to a set of resource blocks, and, for each sub-frame, a resource block is assigned for transmission to a single UE. In some embodiments, the resource blocks selected for transmission may be selected by the node 104 based on knowledge of instantaneous channel conditions (a.k.a. channel-dependent scheduling).

Channel-dependent scheduling may help to combat frequency-selective fading on the channel; however, it may not be available and/or desirable in all situations. For example, if the node 108 is highly mobile (e.g., is traveling in a vehicle) it may be difficult to track instantaneous channel conditions. For another example, if the information is being broadcast to more than one UE, e.g., node 108 and node 112, channel-dependent scheduling to exploit a particular UE's channel may not be possible.

When channel-dependent scheduling is not available or is not desirable, it may be desirable to increase frequency diversity. Frequency diversity may be attained in LTM by distributing the VREs on resource blocks that are spaced a sufficient distance from one another within the sub-frame. This distribution may work well when the amount of information to be transmitted (e.g., the payload) is sufficient to fill multiple resource blocks.

If, on the other hand, the amount of information to be transmitted is not sufficient to fill multiple resource blocks, distributing the information over multiple resource blocks may result in portions of the transmitting bandwidth being wasted. Accordingly, for transmitting information with relatively small payloads, a distributed transmission mode ("DTM") may be employed. A DTM may provide for the distribution of payloads for multiple UEs over multiple resource blocks. Thus, in a DTM, a single resource block may include information being transmitted to more than one UE.

In embodiments of the present invention, both DTM and LTM transmissions may be multiplexed together in a frequency division multiplexing ("FDM") manner in a downlink from node 104 to node 108 and/or node 112. The allocation of PREs to localized users (e.g., UEs to which an LTM transmission is directed) may be done first to exploit multi-user diversity. Next, the remaining PREs (either a fixed fraction of the overall resource elements, or a dynamically varying fraction) may be allocated among the distributed users (e.g., UEs to which a DTM transmission is directed).

A VRE to be mapped to a PRE of a resource block assigned for localized transmission may be referred to as a localized VRE ("LVRE"); while a VRE to be mapped to a PRE of a resource block assigned for distributed transmission may be referred to as a distributed VRE ("DVRE").

Mapping DVREs to PREs may be relatively straightforward when each of the users' resource requirements is the same. As used herein, a user's resource requirement may be the amount of resource elements desired for transmitting relevant information to UE in the downlink transmission. A user's resource requirements may be expressed, and initially arranged, as a number of DVREs. The number of DVREs to satisfy a user's resource requirement may sometimes be referred to as a distributed virtual resource block (DVRB). When the users' resource requirements are different (resulting in a different number of DVREs (or a different sized DVRB) for each user) the distribution becomes more involved.

Accordingly, embodiments of the present invention, to be described in further detail below, enable a transmitting node, e.g., a node-B, to map information for distributed users to PREs given the possibility of unequal resource requirements.

In this embodiment, let the different resource requirements for K different users be denoted as $l_k$, k=1, ..., K. Thus, the total number of required resource elements ($N_{RE}$) may be given by:

$$N_{RE} = \sum_{k=1}^{K} l_k. \qquad \text{EQ. 1}$$

In this embodiment, it may be assumed that the number of required resource elements, $N_{RE}$, is equal to the number of PREs available for DTM in the sub-frame, $N_{PRE}$. While embodiments described herein may discuss the time unit of the wireless channel as a sub-frame, other embodiments may utilize other time units, e.g., one or more OFDM symbols. The following description provides instruction for mapping a set of DVREs to the $N_{PRE}$ PREs.

In various embodiments, the $N_{PRE}$ PREs may be distributed over the entire band, over certain blocks of sub-carriers, or by a hybrid of the previous two. In all of these cases, an ordered set of resource element indices for PREs allocated for DVREs may be extracted, and, without loss of generality, form a unique mapping to the set of PREs $\{S_i=i, i=1, 2, \ldots, N_{RE}\}$.

This set of PREs, $S_i$, may be mapped to DVREs of the different users, $V_k(j)$, to satisfy respective requirements, $\{l_k\}$. The resource allocation that results in the largest average spacing between adjacent PREs for all users may be chosen to provide for desired frequency diversity for the entire set of users allocated these DVREs subject to the resource constraints.

When the resource requirements for all users are identical, e.g., $l_k=1$ for all k=1, K, the mapping that results may be $V_k(j)=S_{k+(j-1)K}$, k=1, \ldots, K and j=1, \ldots, l.

In the general case when the resource requirements of the different users are unequal, the desired mapping may provide for the PREs that are evenly distributed across all users. A measure for the evenness of the resource element spacing for the $k^{th}$ user may be defined in terms of the deviation from the mean spacing, e.g.:

$$e_k = \sum_{i=2}^{l_k} |d_k(i) - \overline{d}_k|^\gamma, \qquad \text{EQ. 2}$$

where $\overline{d}_k = N_{sc}/l_k$ is the mean spacing between resource elements for the $k^{th}$ user, $d_k(i)=V_k(i)-V_k(i-1)$ is the spacing of the $i^{th}$ resource element for the $k^{th}$ user, and $\gamma=1$ or 2 (although $\gamma$ may be any positive number). The resource allocation algorithm may then seek to assign the resource elements among the different users in such a way that the metric $$m = \sum_{k=1}^{K} e_k, \qquad \text{EQ. 3}$$

is minimized over all distributions.

Figure 2:
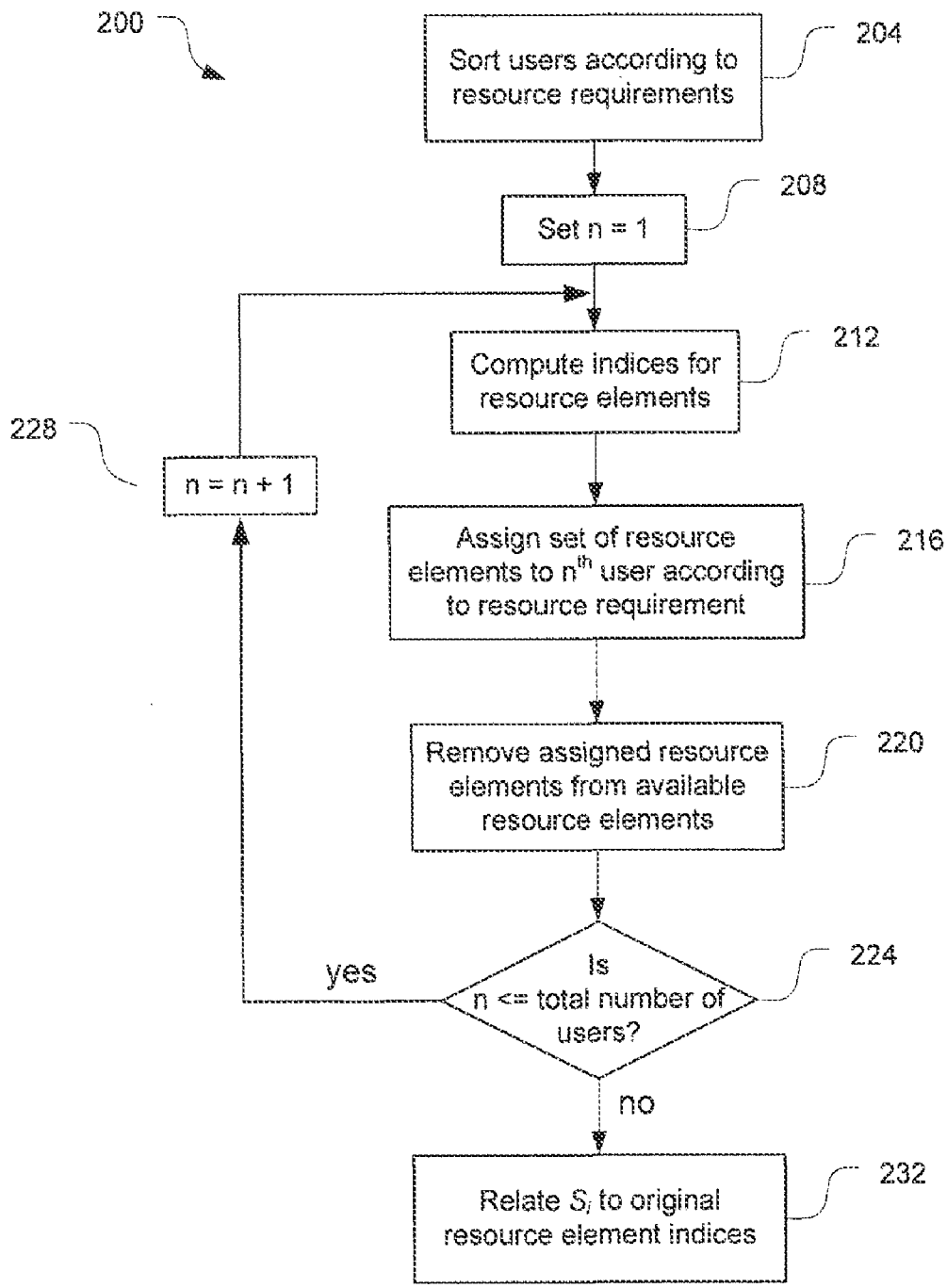
FIG. 2 illustrates a flowchart of a resource allocation algorithm in accordance with various embodiments of the present invention.

FIG. 2 illustrates a flowchart of a resource allocation algorithm 200 that seeks to distribute resources in a manner to provide a desired measure of evenness and/or spacing between adjacent assigned resource elements in accordance with an embodiment of the present invention.

In block 204, the distributed users may be sorted in order according to their resource requirements such that $l_2 \geqq l_2 \geqq \ldots l_K$. This sorting operation may not be performed in some embodiments.

In block 208, a calculation index, n, may be set to 1.

In block 212, a set of resource element indices may be computed. In an embodiment these indices may be computed by the following equation:

$$q_i = \text{in}\left(\frac{i}{l_n}\sum_{k=n}^{K} l_k\right), i=1, \ldots, l_n, \qquad \text{EQ. 4}$$

wherein in(•) is an integer function, e.g., ceil(•) (which rounds the value up to the nearest integer); round(•) (which rounds the value to the nearest integer); or floor(•) (which rounds the value down to the nearest integer).

In block 216, a set of resource elements may then be assigned to the $n^{th}$ user with requirement $l_n$ by $\{V_n(i)=S_{q_i}\}$.

In block 220, the set of resource elements assigned to the $n^{th}$ user in block 216 may be removed from available resource elements, $\{S_i\}$, to form the updated set of resource elements remaining to be assigned. After the update, the remaining elements may be renumbered sequentially (i.e. 1, 2, \ldots) to allow EQ. 4 to work for the next round of iteration.

In block 224, the calculation index, n, may be compared to the total number of distributed users, K, to determine whether resource assignments have been performed for all of the distributed users. If not, the process may proceed to block 228, where the calculation index is incremented, and then back to block 212.

If resource assignments have been performed for all of the distributed users, the process may proceed to block 232. In block 232, $S_i$ (mapped into $V_k(i)$ in block 216) may be related back to the original resource element indices, which may be potentially distributed in chunks across the total bandwidth.

In the above algorithm, it is assumed that $N_{PRE}=N_{RE}$; however, in many embodiments $N_{PRE}$ may be greater than $N_{RE}$. Accordingly, in some embodiments, the mapping algorithm described above may be modified to account for the extra resource elements. For example, a dummy user may be introduced into the mapping along with the real distributed users. The dummy user may be assigned a resource requirement, $l_{dummy}$, equal to the difference between the number of available resource elements, $N_{PRE}$, and the number of required resource elements, $N_{RE}$. That is, $l_{dummy}=N_{PRE}-N_{RE}$.

The dummy user and its associated resource requirement may be included in the algorithm described in FIG. 2, making the total user set equal to K plus one. Once the mapping is complete, the resource allocated to the dummy user, which may be unused, may add to the spacing between the assigned resource elements of the real users.

In an embodiment, the dummy user may be placed into at the beginning of the sorted order of users, e.g., in block 204, regardless of its requirement. This may provide the initial, n=1, distribution to be provided to the dummy user, with the remaining active allocations being interspersed throughout the other PREs. The dummy user may be appended to the ended of the sorted order of users.

Having extra resource elements may be accounted for in other ways in other embodiments. For example, in another embodiment a spacing factor, S, may be used to adequately spread the resource elements of the distributed users over the available PREs.

In this embodiment, the set of available PREs may be defined as $S_i=i, i=1, 2, \ldots, N_{PRE}$, where $N_{PRE} \geqq N_{RE}$. The spacing factor, S, may be defined as follows:

$$S = \left\lceil \frac{N_{PRB}}{N_{RE}} \right\rceil. \qquad \text{EQ. 5.}$$

Figure 3:
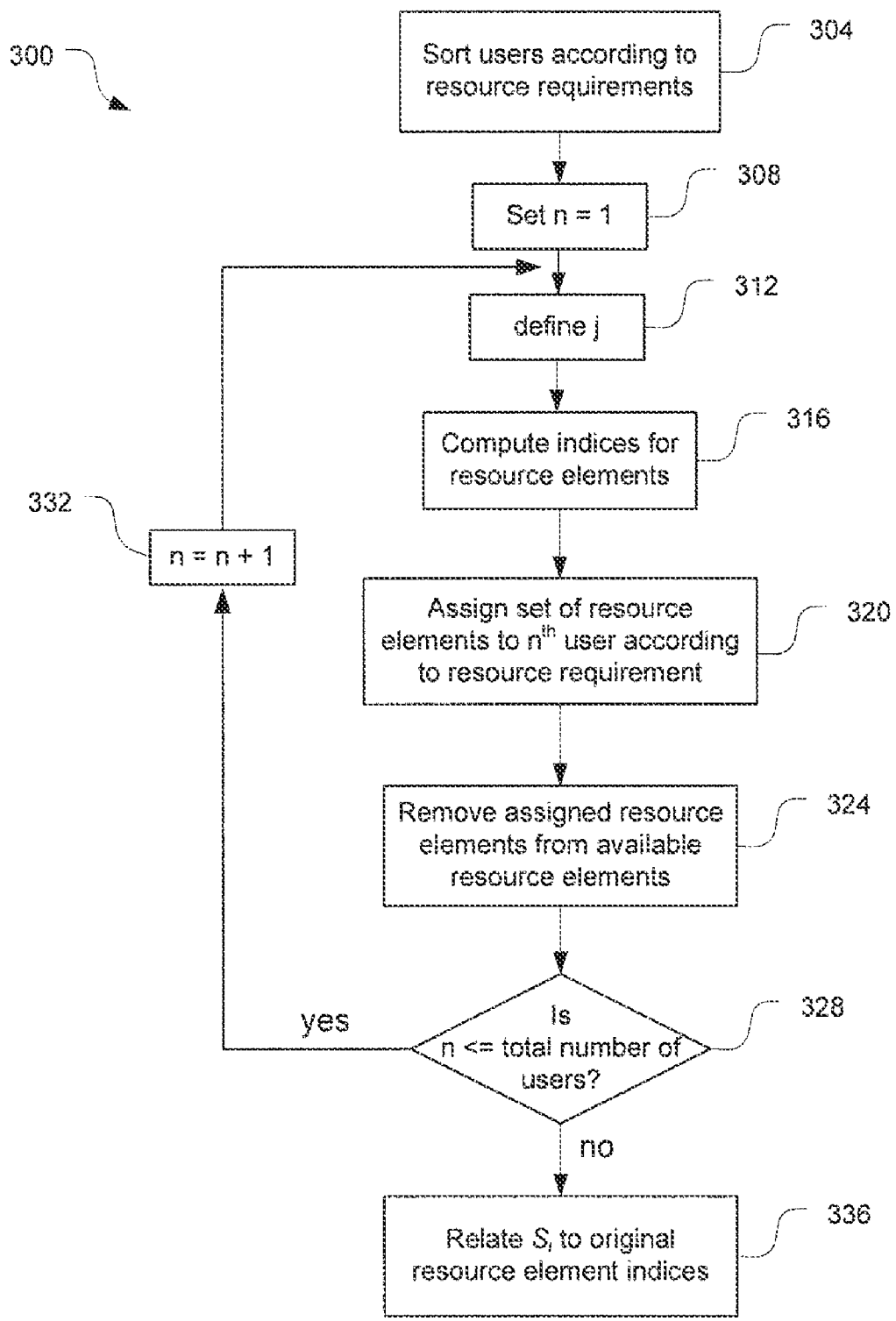
FIG. 3 illustrates a flowchart of another resource allocation algorithm in accordance with various embodiments of the present invention.

FIG. 3 illustrates a flowchart of a resource allocation algorithm 300 that seeks to provide a resource allocation accounting for extra available PREs utilizing this spacing factor in accordance with an embodiment of the present invention.

In block 304, similar to block 204, the distributed users may be sorted according to their resource requirements such that $l_1 \geqq l_2 \geqq \ldots \geqq l_K$.

In block 308, similar to block 208, a calculation index, n, may be set to 1.

In block 312, a spacing function, j, may be defined by the following equation:

$$j = \begin{cases} i \cdot S, i = 1, \ldots, \left\lceil \frac{N_{PRE}}{S} \right\rceil \\ \mathrm{mod}(i \cdot S - 1, N_{PRE}) + 1, i > \left\lceil \frac{N_{PRE}}{S} \right\rceil \end{cases} \quad \text{EQ. 6.}$$

$$i = 1, \ldots, l_n,$$

In block 316, a set of indices, $q_i$, may be computed. In an embodiment these indices, $q_i$, may be computed by the following equation:

$$q_i = \mathrm{in}\left(\frac{j}{l_n} \sum_{k=n}^{K} l_k\right), i = 1, \ldots, l_n, \quad \text{EQ. 7}$$

and further modify the set of indices as follows:

$$q_i = \mathrm{mod}(q_i - 1, N_{PRE}) + 1 \quad \text{EQ. 8}$$

In block 320, the set of resource elements may be assigned to the $n^{th}$ user with requirement $l_n$ by $\{V_n(i) = S_{q_i}\}$.

In block 324, the set of resource elements assigned to the $n^{th}$ user in block 320 may be removed from available resource elements, $\{S_i\}$, to form the updated set of resource elements remaining to be assigned. $N_{PRE}$ may be updated to reflect the reduced number of available resource elements. The updated $N_{PRE}$ may be used in EQ. 6 to compute j for a different i.

In block 328, similar to block 224, the calculation index, n, may be compared to the total number of distributed users, K, to determine whether resource assignments have been performed for all of the distributed users. If not, the process may proceed to block 332, where the calculation index n is incremented, and then back to block 312.

If resource assignments have been performed for all of the distributed users, the process may proceed to block 336. In block 336, $S_i$ (mapped into $V_k(i)$ in block 320) may be related back to the original resource element indices, which may be potentially distributed in chunks across the total bandwidth.

In some embodiments, particularly in the case of grouped approach to mapping of distributed users, downlink performance may be further improved through frequency diversity and interference randomization by varying the mapping in the time domain, e.g., every symbol.

For example, as discussed above, once the resource mapping for the localized users has been determined, the next phase may be to compute the resource mapping for the distributed users, e.g., as described in FIG. 2 and associated discussion. This mapping may determine the initial allocation pattern for that scheduling unit, e.g., for a 0.5 millisecond sub-frame or one OFDM symbol. In an embodiment, a mapping scheme employed in a subsequent scheduling unit, e.g., the next sub-frame, may be a variation of the initial mapping scheme. For example, a subsequent mapping scheme may be varied from the previous mapping scheme by a cyclical shift, e.g., the initial mapping is cyclically shifted modulo the number of physical resource elements $N_{PRE}$ by one or more units; by reversal, e.g., the initial mapping may be reversed in the frequency domain; or by a combination of a cyclical shift and reversal.

These techniques may help to improve the performance of the grouped approach in the case of the distributed users and leverage some of the benefits of the scattered approach.

Figure 4:
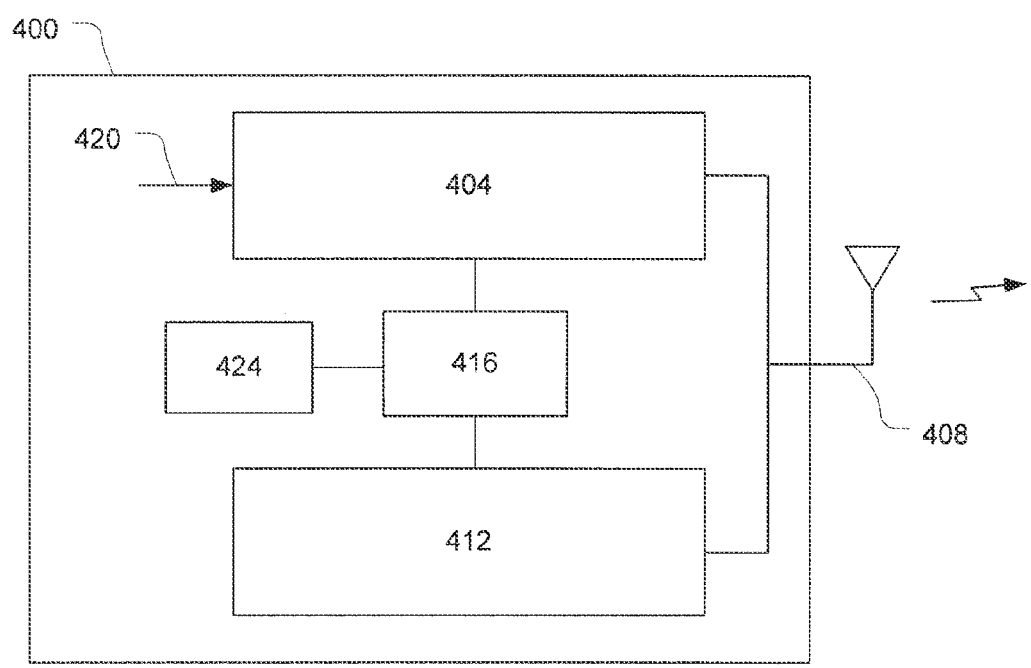
FIG. 4 illustrates a wireless communication node in accordance with various embodiments of the present invention.

FIG. 4 illustrates a node 400 in accordance with an embodiment of the present invention. The node 400 may be similar to, and substantially interchangeable with, the node 104 shown and described above. In this embodiment, the node 400 may include transmit circuitry 404 coupled to an antenna structure 408, which may be similar to the antenna structure 120. The transmit circuitry 404 may include one or more transmit chains to transmit information over one or more spatial channels.

The node 400 may also include receive circuitry 412 coupled to the antenna structure 120. Similar to the transmit circuitry 404, the receive circuitry may include one or more receive chains to receive information over one or more spatial channels.

The node 400 may further include a scheduler 416 coupled to the transmit circuitry 404 and to the receive circuitry 412. The scheduler 416 may perform the various resource allocation mapping and assignments discussed above in accordance with various embodiments of the invention.

The transmit circuitry 404 may receive information 420 to be transmitted to a plurality of users; receive assignments of available resources from the scheduler 416, and map the information onto the available resources. The transmit circuitry 404 may then cause the information to be transmitted over the antenna structure 408.

As discussed above, assignments of transmissions to localized users may be done in accordance with channel-dependent scheduling. Accordingly, in some embodiments, the scheduler 416 may be coupled to the receive circuitry 412 to receive uplink feedback from users (e.g., control information in an uplink transmission) on current channel conditions to facilitate channel dependent scheduling.

In embodiments where the node 400 is a multi-antenna node, the uplink feedback may include pre-coding information. Pre-coding information may be indices that are transmitted by a UE, e.g., node 108, to a node-B, e.g., node 420. The node 420, and in particular, the scheduler 416, may receive the indices and access a codebook 424 to select beam-forming vectors to be used in the downlink to the node 108 that accounts for the instantaneous channel conditions. With proper coding of the uplink feedback channel, the probability of the uplink feedback being corrupted may be small. In the event of corruption, the desired beam-forming vectors may be recovered either by blind detection methods, where the node 108 performs a codebook search, or by the convergence of tracking codebooks, especially for low-mobility channels. In addition, for highly mobile UEs, the use of dedicated mid-amble sequences may also be used to validate beam-forming vectors.

In accordance with an embodiment of the present invention, the node 108 may transmit uplink feedback in a transmission that occurs on a first band of frequencies. The scheduler 416 may receive this uplink feedback and perform a validation of the control information contained therein. The scheduler 416 may then cause an indication of the validation to be transmitted in a downlink transmission back to the node 108. The validation may be transmitted in a downlink that is in a band of frequencies other than the band used for the uplink feedback. This out-band control signal may avoid the use of mid-amble sequences in the case of high mobility UEs.

The uplink feedback may have a block code or cyclical redundancy check (CRC) with error detection capabilities in order to facilitate the validation.

In some embodiments, the out-band control signal may also include hybrid automatic repeat request (ARQ) feedback.

In some embodiments, the scheduler 416 may also determine feedback rates for channel state information. The node 400 may use the uplink channel to estimate Doppler spread (or inter-carrier interference (ICI) level) and adjust the sub-carrier spacing in the downlink to mitigate ICI. The node 400 may additionally/alternatively conduct link and rank adaptation according to the (variation rate or) Doppler spread. In this case, unlike the previous, the transmitter tries to compensate the loss due to Doppler for the receiver. For example, the transmitter at node 400 may reduce modulation order and code rate if the Doppler spread increases because the Doppler spread affects the channel estimation at the receiver.

By doing these techniques, the scheduler 416 may exploit the reciprocity of the time variation between the uplink and downlink channels. Namely, although the channel response in frequency division duplexing (FDD) may not be reciprocal, the Doppler spread (or time variation rates) may still be the same between downlink and uplink, where the time variation is due to mobility of the UE or medium variation in the propagation path.

In some embodiments, these techniques may be extended to some time-division duplexing (TDD) cases where channel reciprocity does not exist. For example, the effective downlink channel includes the transmit chain of node 400 and a receive chain of a UE, while the uplink channel includes a transmit chain of the UE and the receive chain of the node 400. Because the chains have active components the effective channel may not be reciprocal. For another example, a UE may have more receive chains (or antennas) than transmit chains and the effective channel may not be reciprocal because some of the UE's receive antennas may not be sounded in the uplink. In such TDD cases, the channel reciprocity may not exist, but the variation reciprocity still holds.

While properly timed feedback may facilitate achieving the benefits provided by these techniques, improperly timed feedback may negate them. For example, if the feedback is not sent in a timely manner, the node 400 may only use the previously received feedbacks to conduct beamforming and/or link/rank adaptation. The previous feedback may be outdated if the channel changes too fast and the feedback delay may then cancel out the gain of beamforming. For example, the previous fed back beamforming vector points to 30 degrees while the ideal current beamforming angle may be 60 degrees. If the beamforming error 30=60−30 degree cancels out the beamforming gain, then the feedback rate should be increased. For the case of MCS feedback, the outdated feedback can reduce the gain of link adaptation or even cause the link be disconnected.

Accordingly, to facilitate these techniques, embodiments of the present invention may provide for the scheduler 416 to determine how often the UE should feedback channel state information. This may be done by the following process.

The scheduler 416 may receive a signal from a UE, via the receive circuitry 412, in an uplink. The scheduler may then estimate the time variation (or Doppler spread) in the received signal. The scheduler 416 may determine the feedback rate of the channel state information such as beamforming matrix, channel quality indicator (CQI) report, and/or modulation and coding scheme (MCS). The scheduler 416 may then transmit the rate and other requirements, via the transmit circuitry 404, to the UE. The UE may then feedback information at the specified rate.

Figure 5:
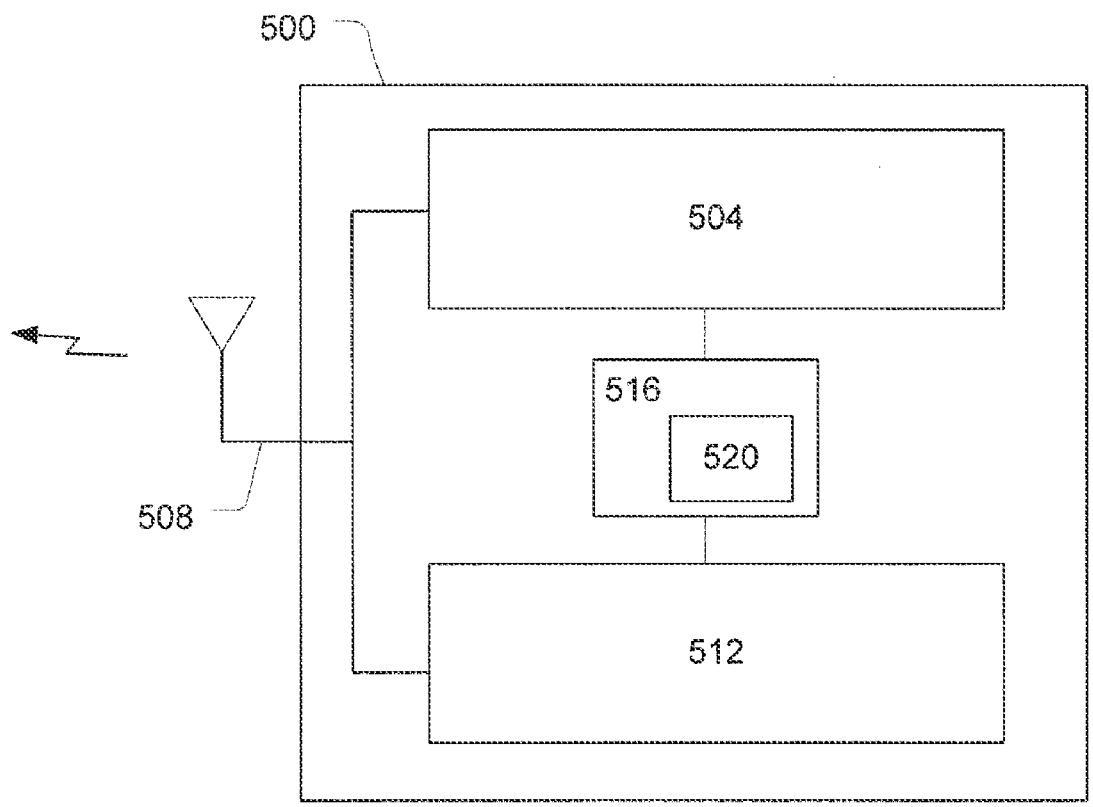
FIG. 5 illustrates another wireless communication node in accordance with various embodiments of the present invention.

FIG. 5 illustrates a node 500 in accordance with an embodiment of the present invention. The node 500 may be similar to, and substantially interchangeable with, the nodes 108 and/or 112 shown and described above. The node 500 may include transmit circuitry 504 coupled to an antenna structure 508, which may be similar to the antenna structure 124 and/or 128. The transmit circuitry 504 may include one or more transmit chains to transmit information over one or more spatial channels.

The node 500 may also include receive circuitry 512 coupled to the antenna structure 508. Similar to the transmit circuitry 504, the receive circuitry may include one or more receive chains to receive information over one or more spatial channels.

The node 500 may further include a feedback controller 516. The feedback controller 516 may include a channel condition detector 520, coupled to the receive circuitry 512, and configured to determine a condition of one or more spatial channels over which information is received. The feedback controller 516 may develop a CQI level to indicate the determined condition and transmit the CQI level in the uplink feedback to the node 104.

In various embodiments, the CQI feedback may be used by the node 104 for channel-dependent scheduling (as discussed above); selection of modulation and coding scheme; interference management; and/or transmission power control for physical channels.

Figure 6:
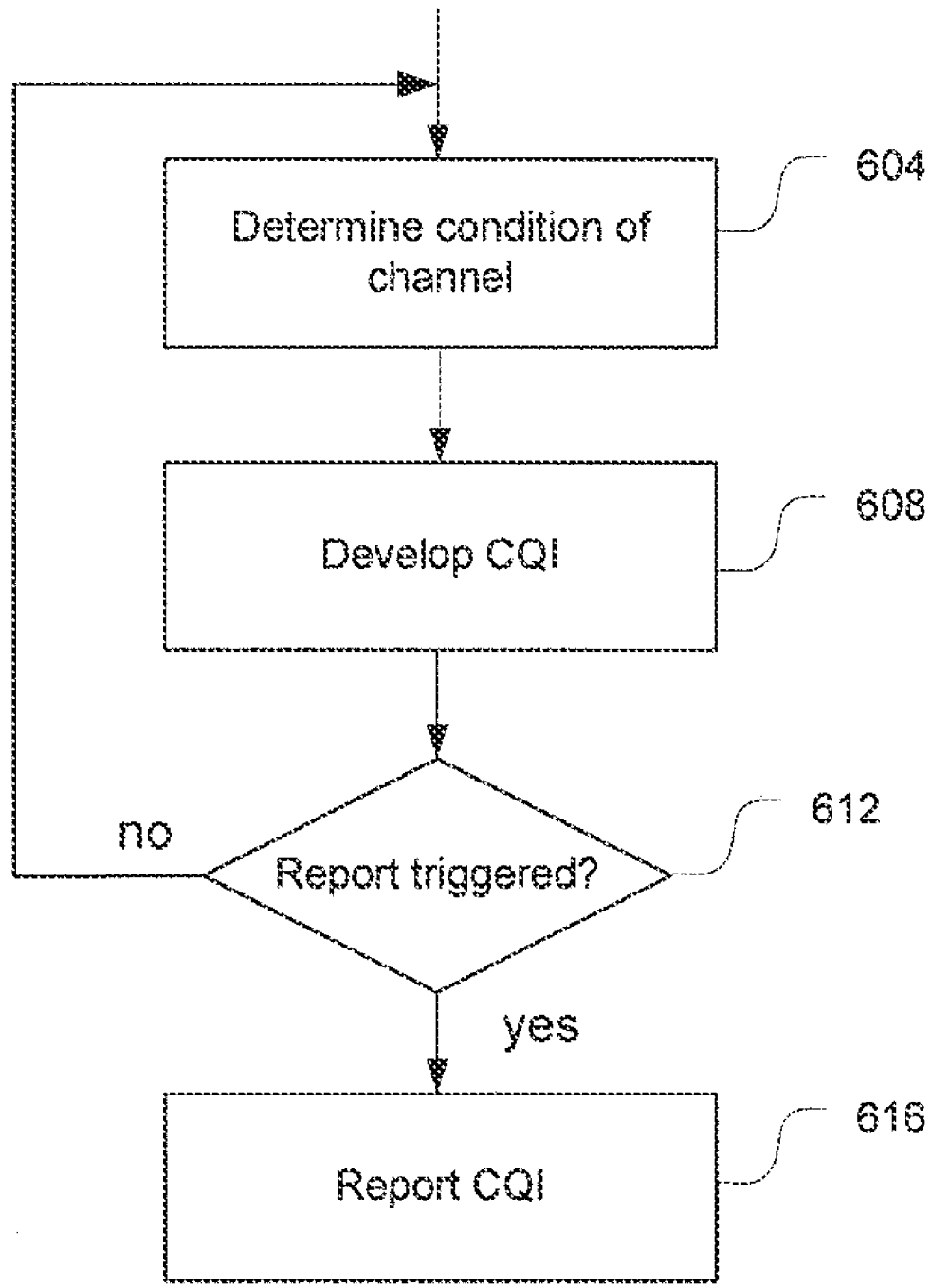
FIG. 6 illustrates a flowchart of a channel condition report in accordance with various embodiments of the present invention.

FIG. 6 illustrates a flowchart of a channel condition report 600 in accordance with an embodiment of the present invention. In this embodiment, the channel condition detector 520 may cooperate with the receive circuitry 512 to determine a condition of a channel, block 604. The feedback controller 516 may then develop a CQI value to indicate the determined condition, block 608.

The feedback controller 516 may determine if a report is triggered, block 612 and, if so, report the CQI in an uplink feedback, block 616. In embodiments utilizing MIMO transmissions, the amount of CQI feedback may vary with the number of channel streams, antenna configurations, and changing channel conditions. A CQI value may have a variable length to account for the varying amount of feedback. Therefore, in addition to transmitting the CQI value itself, the node 500 may also transmit the length of the CQI value.

If a report is not triggered in block 612, the reporting process may loop back to block 604. Determining channel condition in block 604 and developing CQI value in block 608 may collectively be referred to as monitoring the CQI value.

In various embodiments, a report may be triggered in various ways. For example, a node-B, e.g., node 104, may periodically schedule an uplink feedback for node 500. This schedule may be communicated to the node 500 an uplink map broadcast by the node 104. Receiving an indication of this scheduling may be considered to trigger a CQI report. While periodic reporting may provide for comprehensive channel condition reporting, the overhead required for this reporting may be unnecessarily burdensome on the system 100. Therefore, in accordance with embodiments of the present invention, an event-driven reporting mode is introduced.

Figure 7:
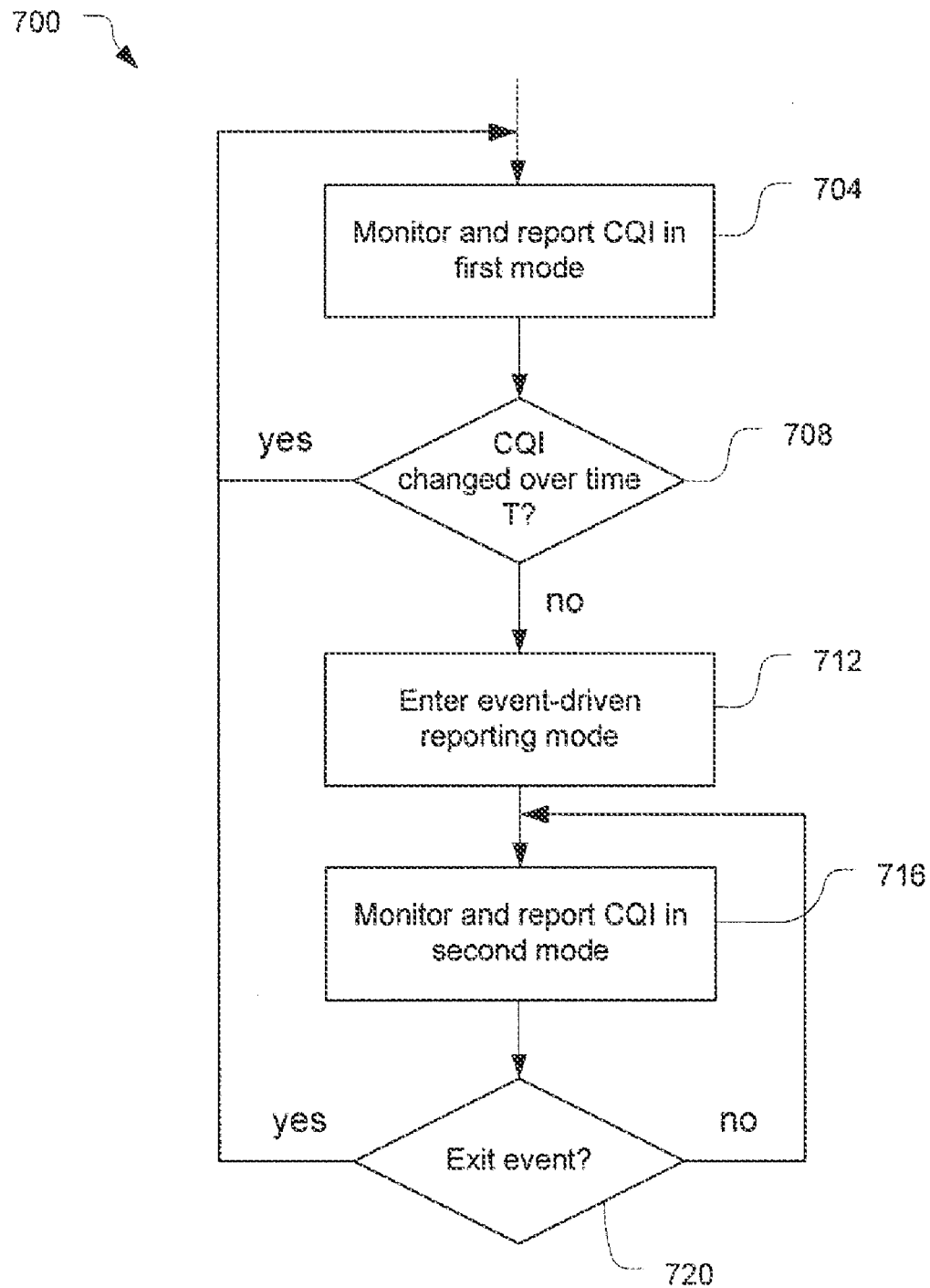
FIG. 7 illustrates a flowchart of a reporting mode sequence in accordance with various embodiments of the present invention.

FIG. 7 illustrates a flowchart of a reporting mode sequence 700 in accordance with various embodiments of the present invention. In this embodiment, the feedback controller 516 may monitor and report CQI values in a non-event driven mode in block 704. In the non-event driven mode the reports may be triggered, e.g., on a periodic basis. The feedback controller 516 may determine whether the CQI value has changed over a predetermined time, T, in block 708. The predetermined time T may be a configurable value, e.g., a timer could be N*CQI reporting period interval during non-event driven mode; where N is an integer. If the CQI value has changed over time T, then the feedback controller 516 may continue to monitor and report CQI in the non-event driven mode in block 704. If the CQI value has not changed over time T, then feedback controller 516 may enter an event-driven CQI reporting mode in block 712. While in the event-driven reporting mode the feedback controller 516 may monitor CQI values and report the values when certain variances in the channel conditions are detected, rather than on a periodic basis. The feedback controller 516 may determine whether an event-driven reporting mode exit event has occurred in block 720. If not, the feedback controller 516 may continue to monitor and report CQI value in the event-driven reporting mode. If an exit event does occur, the feedback controller 516 may loop back to block 704 and revert to monitoring and reporting CQI values in the non-event driven mode.

In some embodiments, an event-driven reporting mode exit event may occur when the channel conditions change within a predetermine interval and the corresponding CQI value is different from the last reported value. In some embodiments, if the channel changes too often, periodic feedback may be more efficient and the detection of the high variation rate triggers the event to exit the event-driven mode.

In some embodiments, the event-driven reporting mode exit event may occur by the feedback controller 516 sending an in-band control signal to the node 104 or by sending a contention-based CQI report (e.g., transmitting a CQI report during a contention period of an uplink frame). For the contention-based report, consider an embodiment where there are K UEs in the area, and currently L UEs are not in event-driven reporting mode. In this case, the node 104 may schedule the L UEs for periodic CQI reporting. In addition, the node 104 may also schedule M (M<K−L) resources in order for the K-L UEs to potentially contend for CQI reporting when they come out of event driven CQI reporting mode. The contention may be code-domain based. These contention based reports may include the UE identifier in addition to the CQI report itself. Note that the value of M compared to K-L may be based on the channel correlation between the K-L users.

Once the node 104 receives an in-band signaling message or the contention based CQI report from the UE, the node 104 may schedule resources for the UE to send CQI reports in a non-event driven reporting mode.

In some embodiments, the node 104 may predict that a UE will exit an event driven reporting mode and start scheduling resources for the UE to send CQI reports. There may be a number of ways that the node 104 may predict the channel condition changes at the UE (e.g., by detecting changing channel conditions). In-band signaling or the contention based CQI reporting may be avoided by the node 104 autonomously performing prediction and assigning the necessary resources for the UE to start sending the CQI report in non event-driven fashion.

In some embodiments, the techniques, or variations thereof, described above to exploit the variation reciprocity may be used here for the node 104 to schedule feedback modes, e.g., event-driven or periodic, for the UEs.

In some embodiments, an event-driven reporting mode exit event may be timer based. For example, upon entering the event-driven reporting mode, the feedback controller 516 may start a timer. The timer may be reset whenever the CQI transmission resumes. If the timer expires, the node 104 may schedule resources for the node 500 and the feedback controller 516 may resume its CQI transmission. Alternatively, it is also possible to send the timer-based CQI report using in-band signaling. Once the CQI is sent, the feedback controller 516 may go back to event-driven reporting mode as per the mode entry rule. The value of the timer may be configurable by the node 104. If the timer is configured to 0, the event driven CQI reporting mode may be disabled.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

The invention claimed is:

1. A non-transitory, machine-accessible medium having associated instructions that, when executed, results in a machine:
   identifying downlink resource requirements for transmission of orthogonal frequency-division multiplexing (OFDM) symbols to a plurality of users over a time unit of a wireless channel, wherein the downlink resource requirements are arranged as distributed virtual resource blocks;
   sorting the plurality of users according to their respective downlink resource requirements to provide a sorted list of the plurality of users, wherein a size of a first downlink resource requirement for a first user of the plurality of users is different than a size of a second downlink resource requirement for a second user of the plurality of users;
   computing indices for available downlink resource elements of the time unit of the wireless channel, wherein the available downlink resource elements are physical resource elements of one or more resource blocks, wherein individual resource blocks of the one or more resource blocks are to include information transmitted to more than one user; and
   assigning the available downlink resource elements to the plurality of users based at least in part on the sorted list and the computed indices.

2. The non-transitory machine-accessible medium of claim 1, wherein said assigning the available downlink resource elements is done in a manner to distribute the assigned downlink resource elements across the plurality of users with a desired measure of evenness and/or spacing between adjacent assigned downlink resource elements.

3. The non-transitory machine-accessible medium of claim 2, wherein a number of available downlink resource elements is greater than a number of required downlink resource elements and the instructions, when executed, further results in the machine:
   assigning the available downlink resource elements in a manner to provide a desired measure of spacing based at least in part on a spacing factor, S, defined by:

$$S = \left\lceil \frac{N_{ARE}}{N_{RRE}} \right\rceil,$$

where $N_{ARE}$ is the number of available downlink resource elements and $N_{RRE}$ is the number of required downlink resource elements.

4. The non-transitory, machine-accessible medium of claim 2, wherein said assigning the available downlink resource elements to the plurality of users in a manner to distribute the assigned downlink resource elements across the plurality of users with a desired measure of evenness and/or spacing between adjacent assigned resource elements further comprises:

computing indices, $q_i$, for the available downlink resource elements by $$q_i = \text{int}\left(\frac{i}{l_n}\sum_{k=n}^{K} l_k\right),$$

$i=1, \ldots, l_n$, where $l_n$ is a resource requirement for an $n^{th}$ user of the plurality of users, and K is a number of the plurality of users; and assigning the available downlink resource elements to the plurality of users by $\{V_n(i)=S_{q_i}\}$, where $V_n(i)$ is an $i^{th}$ downlink resource requirement of the $n^{th}$ user and $S_{q_i}$ is a $q_i^{th}$ available downlink resource element.

5. The non-transitory machine-accessible medium of claim 1, wherein a number of available downlink resource elements is greater than a number of required downlink resource elements and the instructions, when executed, further results in the machine:

assigning a downlink resource requirement to a dummy user that is equal to a difference between the number of available downlink resource elements and the number of required downlink resource elements; and assigning the available downlink resource elements to the plurality of users and to the dummy user.

6. The non-transitory, machine-accessible medium of claim 1, wherein said assigning of the available downlink resource elements to each of the plurality of users is in accordance with a mapping scheme and the instructions, when executed, further results in the machine:

assigning available downlink resource elements of another time unit of the wireless channel to each of the plurality of users in accordance with another mapping scheme that is varied from the mapping scheme.

7. The non-transitory, machine-accessible medium of claim 6, wherein the other mapping scheme is varied from the mapping scheme by a cyclical shift and/or a reversal.

8. The non-transitory, machine-accessible medium of claim 1, wherein the plurality of users are distributed users and the instructions, when executed, further result in the machine:

assigning a first set of downlink resource elements of the time unit to one or more localized users prior to said determining the available downlink resource elements.

9. An apparatus comprising:
a scheduler configured to:
identify downlink resource requirements for transmission of orthogonal frequency-division multiplexing (OFDM) symbols to a plurality of users over an evolved-universal mobile telephone system (UMTS) terrestrial radio access (E-UTRA) downlink channel;
sort the plurality of users according to their respective downlink resource requirements to provide a sorted list of the plurality of users, wherein a size of a first downlink resource requirement for a first user of the plurality of users is different than a size of a second downlink resource requirement for a second user of the plurality of users;
determine available downlink resource elements of the E-UTRA downlink channel, wherein the available downlink resource elements are physical resource elements of one or more resource blocks;
compute indices for the available downlink resource elements; and assign the available downlink resource elements to the plurality of users based at least in part on the sorted list and the computed indices; and transmit circuitry operatively coupled to the scheduler and configured to receive information to be transmitted to the plurality of users and to map the received information to the available downlink resource elements based at least in part on assignments of the available downlink resource elements to the plurality of users provided by the scheduler.

10. The apparatus of claim 9, wherein the downlink resource requirements are arranged as distributed virtual resource elements.

11. The apparatus of claim 9, wherein said assignment of the available downlink resource elements is done in a manner to distribute the assigned downlink resource elements across the plurality of users with a desired measure of evenness and/or spacing between adjacent assigned downlink resource elements.

12. The apparatus of claim 11, wherein a number of available downlink resource elements is greater than a number of required downlink resource elements and the scheduler is further configured to:

assign the available downlink resource elements in a manner to provide a desired measure of spacing based at least in part on a spacing factor, S, defined by:

$$S = \left\lceil \frac{N_{ARE}}{N_{RRE}} \right\rceil,$$

where $N_{ARE}$ is the number of available downlink resource elements and $N_{RRE}$ is the number of required downlink resource elements.

13. The apparatus of claim 11, wherein the scheduler is configured to assign the available downlink resource elements to the plurality of users in a manner to distribute the assigned downlink resource elements across the plurality of users with a desired measure of evenness and/or spacing between adjacent assigned resource elements by being configured to:

compute indices, $q_i$, for the available downlink resource elements by $$q_i = \text{int}\left(\frac{i}{l_n}\sum_{k=n}^{K} l_k\right),$$

$i=1, \ldots, l_n$, where $l_n$ is a resource requirement for an $n^{th}$ user of the plurality of users, and K is a number of the plurality of users; and assign the available downlink resource elements to the plurality of users by $\{V_n(i)=S_{q_i}\}$, where $V_n(i)$ is an $i^{th}$ downlink resource requirement of the $n^{th}$ user and $S_{q_i}$ a $q_i^{th}$ available downlink resource element.

14. The apparatus of claim 11, wherein a number of available downlink resource elements is greater than a number of required downlink resource elements and the scheduler is further configured to assign a downlink resource requirement to a dummy user that is equal to a difference between the number of available downlink resource elements and the number of required downlink resource elements; and assign the available downlink resource elements to the plurality of users and to the dummy user.

15. The apparatus of claim 11, further comprising:
receive circuitry operatively coupled to the scheduler and configured to receive feedback information from one or more localized users.

16. The apparatus of claim 15, wherein the plurality of users are distributed users and the scheduler is further configured to assign a first set of downlink resource elements of the time unit to the one or more localized users, based at least in part on the received feedback information, prior to a determination of the available downlink resource elements.

17. The apparatus of claim 11, wherein a subframe of the E-UTRA downlink channel is to include both a distributed transmission mode transmission and a localized transmission mode transmission frequency-division multiplexed with one another.

18. The apparatus of claim 17, wherein at least one of the one or more resource blocks comprises the distributed transmission mode transmission.

* * * * *

UNITED STATES PATENT AND TRADEMARK OFFICE
CERTIFICATE OF CORRECTION

PATENT NO. : 8,401,563 B2  Page 1 of 1
APPLICATION NO. : 13/235290
DATED : March 19, 2013
INVENTOR(S) : Qinghua Li et al.

It is certified that error appears in the above-identified patent and that said Letters Patent is hereby corrected as shown below:

In the Claims

Column 14

Line 57, "...and $S_{q_i}$ B..." should read --... $S_{q_i}$ is a...--.

Signed and Sealed this
Twelfth Day of May, 2015

Michelle K. Lee
*Director of the United States Patent and Trademark Office*